United States Patent [19]

Hurter

[11] Patent Number: 5,663,309
[45] Date of Patent: Sep. 2, 1997

[54] DIAZO DYES HAVING A PHENYLENE GROUP AS THE MIDDLE COMPONENT AND A NAPHTHALENE GROUP AS THE TERMINAL DIAZO COMPONENT

[75] Inventor: Rudolf Hurter, Basel, Switzerland

[73] Assignee: Ciba-Geigy Corporation, Tarrytown, N.Y.

[21] Appl. No.: 567,610

[22] Filed: Dec. 5, 1995

[30] Foreign Application Priority Data

Dec. 12, 1994 [CH] Switzerland .................. 3758/94

[51] Int. Cl.$^6$ .................. C09B 31/08; C09B 31/072; C09B 31/14; C09B 31/143; C09B 31/15; D06P 3/06
[52] U.S. Cl. .................. 534/763; 534/764; 534/832; 534/834; 534/835; 534/836; 534/837
[58] Field of Search .................. 534/832, 834, 534/763, 764, 837, 835, 836

[56] References Cited

U.S. PATENT DOCUMENTS

| | | | |
|---|---|---|---|
| 3,676,050 | 7/1972 | James | 534/832 X |
| 4,143,035 | 3/1979 | Stingl, I. | 534/832 |
| 4,173,565 | 11/1979 | Stingl, II | 534/837 X |
| 4,217,102 | 8/1980 | Stingl, III | 8/662 |
| 4,323,498 | 4/1982 | Benguerel, I | 260/187 |

FOREIGN PATENT DOCUMENTS

| | | | |
|---|---|---|---|
| 2990474 | 6/1976 | France | 534/832 |
| 1-221458 | 9/1989 | Japan | 534/837 |
| 0635361 | 3/1983 | Switzerland | 534/837 |

| | | | |
|---|---|---|---|
| 1477084 | 6/1977 | United Kingdom | 534/837 |

*Primary Examiner*—Floyd D. Higel
*Attorney, Agent, or Firm*—Kevin T. Mansfield

[57] ABSTRACT

Azo dyes of the formula

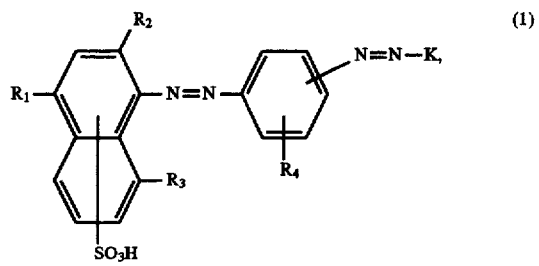

in which
$R_1$ is hydrogen or substituted or unsubstituted phenylamino,
$R_2$ is hydrogen, amino or N-mono- or N,N-di-$C_1$–$C_4$alkylamino,
$R_3$ is hydrogen or hydroxyl,
$R_4$ is hydrogen, $C_1$–$C_4$alkyl, $C_1$–$C_4$alkoxy, $C_2$–$C_4$alkanoylamino, ureido or halogen and
K is as defined in claim 1,
the azo dyes of the formula (1) comprising at least one and not more than two sulfo groups,
are particularly suitable for dyeing or printing cellulosic fibre materials or naturally occurring or synthetic polyamide fibre materials with a high dyeing yield, and give dyeings and prints with good fastness properties.

13 Claims, No Drawings

DIAZO DYES HAVING A PHENYLENE GROUP AS THE MIDDLE COMPONENT AND A NAPHTHALENE GROUP AS THE TERMINAL DIAZO COMPONENT

The present invention relates to novel azo dyes, processes for their preparation and the use of these dyes for dyeing and printing fibre materials, in particular textile fibre materials.

The present invention relates to azo dyes of the formula

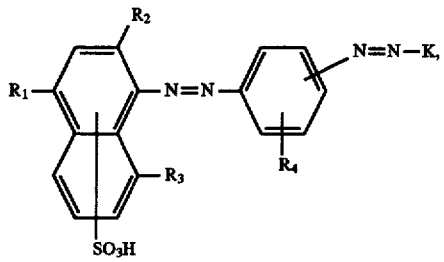

in which $R_1$ is hydrogen or substituted or unsubstituted phenylamino, $R_2$ is hydrogen, amino or N-mono- or N,N-di-$C_1$–$C_4$alkylamino, $R_3$ is hydrogen or hydroxyl, $R_4$ is hydrogen, $C_1$–$C_4$alkyl, $C_1$–$C_4$alkoxy, $C_2$–$C_4$alkanoylamino, ureido or halogen and K is a radical of the formula

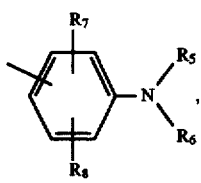

in which $R_5$ and $R_6$ independently of one another are hydrogen or $C_1$–$C_4$alkyl which is unsubstituted or substituted by hydroxyl or phenyl, in which the phenyl radical is unsubstituted or substituted by $C_1$–$C_4$alkyl, $C_1$–$C_4$alkoxy, $C_2$–$C_4$alkanoylamino, ureido, halogen or sulfo, and $R_7$ and $R_8$ independently of one another are hydrogen, $C_1$–$C_4$alkyl, $C_1$–$C_4$alkoxy, $C_2$–$C_4$alkanoylamino, ureido, halogen or sulfo;

or a radical of the formula

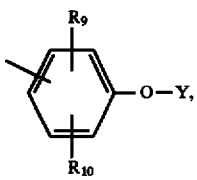

in which

Y is hydrogen or $C_1$–$C_4$alkyl which is unsubstituted or substituted by hydroxyl and $R_9$ and $R_{10}$ independently of one another are hydrogen, $C_1$–$C_4$alkyl, $C_1$–$C_4$alkoxy, $C_2$–$C_4$alkanoylamino, ureido, halogen or sulfo;

or a radical of the formula

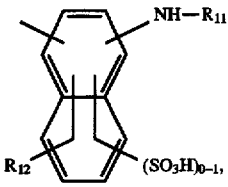

in which $R_{11}$ is hydrogen, $C_1$–$C_4$alkyl or phenyl which is unsubstituted or substituted by $C_1$–$C_4$alkyl, $C_1$–$C_4$alkoxy, $C_2$–$C_4$alkanoylamino, ureido, halogen or sulfo and $R_{12}$ is hydrogen, $C_1$–$C_4$alkyl, $C_1$–$C_4$alkoxy, $C_2$–$C_4$alkanoylamino, ureido, halogen or hydroxyl;

or a radical of the formula

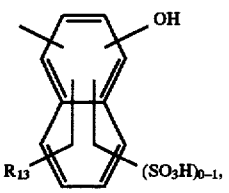

in which $R_{13}$ is hydrogen, $C_1$–$C_4$alkyl, $C_1$–$C_4$alkoxy, $C_2$–$C_4$alkanoylamino, ureido or halogen;

or a radical of the formula

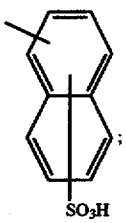

or a radical of the formula

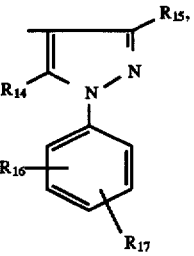

in which $R_{14}$ is amino or hydroxyl, $R_{15}$ is methyl or carboxyl and $R_{16}$ and $R_{17}$ independently of one another are hydrogen, $C_1$–$C_4$alkyl, $C_1$–$C_4$alkoxy, $C_2$–$C_4$alkanoylamino, ureido, halogen or sulfo;

or a radical of the formula

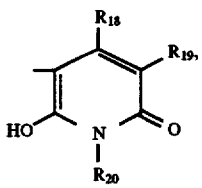
(8)

in which

R$_{18}$ is hydrogen or C$_1$–C$_4$alkyl,

R$_{19}$ is cyano, carbamoyl or sulfomethyl and

R$_{20}$ is hydrogen, C$_1$–C$_4$alkyl or phenyl which is unsubstituted or substituted by C$_1$–C$_4$alkyl, C$_1$–C$_4$alkoxy, C$_2$–C$_4$alkanoylamino, ureido, halogen or sulfo;

or a radical of the formula

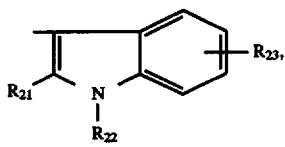
(9)

in which

R$_{21}$ is hydrogen, C$_1$–C$_8$alkyl or phenyl which is unsubstituted or substituted by C$_1$–C$_4$alkyl, C$_1$–C$_4$alkoxy, C$_2$–C$_4$alkanoylamino, ureido, halogen or sulfo, R$_{22}$ is hydrogen or C$_1$–C$_8$alkyl and R$_{23}$ is hydrogen, C$_1$–C$_4$alkyl, C$_1$–C$_4$alkoxy, C$_2$–C$_4$alkanoylamino, ureido, halogen or sulfo;

and the azo dyes of the formula (1) comprise at least one and not more than two sulfo groups, with the proviso that if R$_1$ and R$_2$ are hydrogen and K is a radical of the formula (2), the radical R$_4$ is C$_2$–C$_4$alkanoylamino or ureido.

C$_1$–C$_4$Alkyl radicals Y, R$_4$, R$_5$, R$_6$, R$_7$, R$_8$, R$_9$, R$_{10}$, R$_{11}$, R$_{12}$, R$_{13}$, R$_{16}$, R$_{17}$, R$_{18}$, R$_{20}$, and R$_{23}$ are methyl, ethyl, propyl, isopropyl, butyl, isobutyl, sec-butyl or tert-butyl, in particular methyl or ethyl, where alkyl radicals Y, R$_5$ and R$_6$ can be unsubstituted or further substituted as defined above.

C$_1$–C$_8$Alkyl radicals R$_{21}$ and R$_{22}$ are, for example, methyl, ethyl, propyl, isopropyl, butyl, isobutyl, sec-butyl, tert-butyl or straight-chain or branched pentyl, hexyl, heptyl or octyl, in particular methyl or ethyl.

C$_1$–C$_4$Alkoxy radicals R$_4$, R$_7$, R$_8$, R$_9$, R$_{10}$, R$_{12}$, R$_{13}$, R$_{16}$, R$_{17}$ and R$_{23}$ are, for example methoxy, ethoxy, propoxy, isopropoxy, butoxy, sec-butoxy, isobutoxy or tert-butoxy, in particular methoxy or ethoxy.

C$_2$–C$_4$Alkanoylamino radicals R$_4$, R$_7$, R$_8$, R$_9$, R$_{10}$, R$_{12}$, R$_{13}$, R$_{16}$, R$_{17}$ and R$_{23}$ are, for example, acetylamino, propionylamino or butyrylamino, in particular acetylamino.

Halogen radicals R$_4$, R$_7$, R$_8$, R$_9$, R$_{10}$, R$_{12}$, R$_{13}$, R$_{16}$, R$_{17}$ and R$_{23}$ are, for example, fluorine or bromine, and in particular chlorine.

An N-mono- or N,N-di-C$_1$–C$_4$alkylamino radical R$_2$ is, for example, such a group with methyl or ethyl radicals. N-Mono-C$_1$–C$_4$alkylamines are preferred, for example —NHC$_2$H$_5$ or, in particular, —NHCH$_3$.

Substituted or unsubstituted phenylamino R$_1$ is, in addition to the unsubstituted radicals, for example, the radicals substituted in the phenyl ring by C$_1$–C$_4$alkyl, C$_1$–C$_4$alkoxy, C$_2$–C$_4$alkanoylamino, ureido, halogen or sulfo. Phenylamino which is unsubstituted or substituted in the phenyl ring by C$_1$–C$_4$alkyl, C$_1$–C$_4$alkoxy or halogen, in particular unsubstituted or substituted in the phenyl ring by C$_1$–C$_4$alkyl or C$_1$–C$_4$alkoxy, is preferred. The phenylamino radical is particularly preferably unsubstituted.

R$_1$ is preferably hydrogen or phenylamino, in particular hydrogen.

R$_2$ is preferably hydrogen or amino.

Azo dyes of the formula (1) which are of particular interest are those in which R$_1$, R$_2$ and R$_3$ are hydrogen.

Azo dyes of the formula (1) which are of special interest are furthermore those in which R$_1$ is hydrogen, R$_2$ is amino and R$_3$ is hydroxyl. R$_4$ is preferably hydrogen, C$_1$–C$_4$alkyl, C$_1$–C$_4$alkoxy, C$_2$–C$_4$alkanoylamino or ureido, in particular hydrogen, C$_1$–C$_4$alkyl, C$_1$–C$_4$alkoxy or ureido, preferably hydrogen.

Preferred radicals K of the formula (2) are those in which

R$_5$ and R$_6$ independently of one another are hydrogen or C$_1$–C$_4$alkyl which is unsubstituted or substituted by hydroxyl or phenyl, in which the phenyl radical is unsubstituted or substituted by sulfo, and R$_7$ and R$_8$ independently of one another are hydrogen, C$_1$–C$_4$alkyl or C$_1$–C$_4$alkoxy.

Preferred radicals K of the formula (3) are those in which

Y is hydrogen or C$_1$–C$_4$alkyl, in particular hydrogen, and

R$_9$ and R$_{10}$ independently of one another are hydrogen, C$_1$–C$_4$alkyl or C$_1$–C$_4$alkoxy.

Preferred radicals K of the formula (4) are those in which

R$_{11}$ is hydrogen, C$_1$–C$_4$alkyl or phenyl and

R$_{12}$ is hydrogen or hydroxyl.

Preferred radicals K of the formula (5) are those in which

R$_{13}$ is hydrogen.

Preferred radicals K of the formula (7) are those in which

R$_{14}$ is hydroxyl,

R$_{15}$ is methyl and

R$_{16}$ and R$_{17}$ independently of one another are hydrogen, C$_1$–C$_4$alkyl, C$_1$–C$_4$alkoxy or sulfo.

Preferred radicals K of the formula (8) are those in which

R$_{18}$ is C$_1$–C$_4$alkyl,

R$_{19}$ is cyano or carbamoyl and

R$_{20}$ is C$_1$–C$_4$alkyl.

Preferred radicals K of the formula (9) are those in which

R$_{21}$ is C$_1$–C$_8$alkyl,

R$_{22}$ is hydrogen and

R$_{23}$ is hydrogen.

K is particularly preferably a radical of the formula (3), (4), (6), (7), (8) or (9), in particular a radical of the formula (3), (4) or (6), and preferably a radical of the formula (4) or (6). K is especially preferably a radical of the formula (4).

Preferred azo dyes are those of the formula

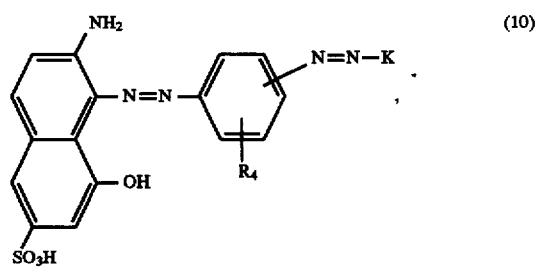
(10)

in which

R$_4$ and K are as defined and preferred above.

Azo dyes which are furthermore preferred are those of the formula

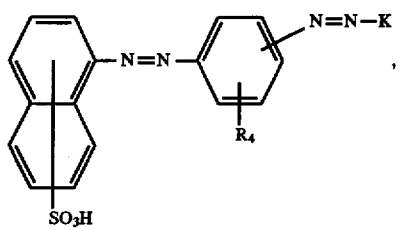

in which

R$_4$ and K are as defined and preferred above.

Preferably, in the azo dyes of the formulae (10) and (11),

R$_4$ is hydrogen, C$_1$–C$_4$alkyl, C$_1$–C$_4$alkoxy, C$_2$–C$_4$alkanoylamino or ureido and K is a radical of the formula (3), (4) or (6), in particular a radical of the formula (4) or (6).

Azo dyes of the formula (10) are of particular interest.

The present invention furthermore relates to a process for the preparation of azo dyes of the formula (1), which comprises diazotizing an amine of the formula

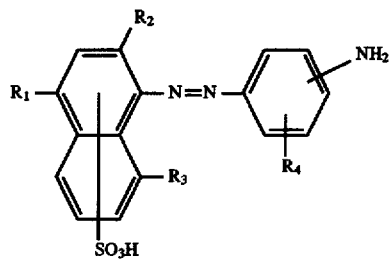

and coupling the diazotization product to a coupling component of the formula

 H—K (13)

or diazotizing an amine of the formula

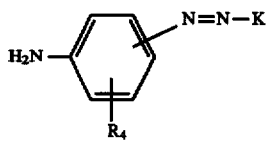

and coupling the diazotization product to a coupling component of the formula

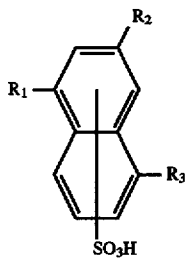

a conversion reaction being carried out, if appropriate, after the reaction of the compounds of the formulae (12) and (13) or of the compounds of the formulae (14) and (15), and R$_1$, R$_2$, R$_3$, R$_4$ and K being as defined under formula (1).

The diazotization is in each case carried out in a manner known per se, for example with a nitrite, for example with an alkali metal nitrite, such as sodium nitrite, in a mineral acid medium, for example in a hydrochloric acid medium, at temperatures of, for example, −5° to 30° C., and preferably at 0° to 10° C.

The coupling is in each case carried out in a manner known per se at acid, neutral to weakly alkaline pH values and at temperatures of, for example, −5° to 30° C., preferably 0° to 25° C.

If appropriate, an alkylation, for example, can also be carried out as a conversion reaction after the preparation of the azo dye. Thus, for example, a hydroxyl group bonded to an aromatic radical can be alkylated, for example by alkylation with dialkyl sulfate, dialkyl carbonate, dialkyl methanephosphonate or methyl toluenesulfonate derivatives. The alkylation is carried out, for example, in aqueous solution by a procedure known per se.

The compounds of the formulae (12), (13), (14) and (15) are known or can be prepared analogously to known compounds.

The dyes of the formula (1) are present either in the form of their free acid or, preferably, as salts thereof.

Suitable salts are, for example, the alkali metal or ammonium salts or the salts of an organic amine.

Examples are the sodium, lithium, potassium or ammonium salts or the salt of mono-, di- or triethanolamine.

The azo dyes of the formula (1) according to the invention are suitable for dyeing and printing, in particular of fibre materials containing nitrogen or hydroxyl groups, paper or leather, for example textile fibre materials of cellulose, silk and, in particular, wool and synthetic polyamides, by methods known per se. The azo dyes of the formula (1) according to the invention can be used for dyeing or printing in the generally customary form, which has been worked up beforehand if appropriate. Level dyeings with good all-round fastness properties, in particular good fastness to rubbing, wet processing, wet rubbing and light, are obtained. The dyes according to the invention furthermore have a very good exhaustion capacity. The dyes according to the invention moreover show a very good build-up capacity and can very readily be combined with other dyes. The abovementioned textile material can be in widely varying forms of processing, for example as fibre, yarn, woven fabric or knitted fabric.

In the following examples, parts are parts by weight. The temperatures are degrees Celsius. Parts by weight bear the same relation to parts by volume as the gram to the cubic centimetre.

Preparation Example 1

34.5 parts of p-nitroaniline are diazotized with sodium nitrite under hydrochloric acid conditions in the customary manner.

The diazo solution thus prepared is added at room temperature to a suspension which comprises 59.8 parts of 2amino-8-naphthol-6-sulfonic acid and 250 parts of water. The coupling reaction is allowed to proceed to completion for 20 hours and the pH is then brought to a value of 9.5 by means of aqueous sodium hydroxide solution (30%). A suspension which comprises the compound, shown in the form of the free acid, of the formula

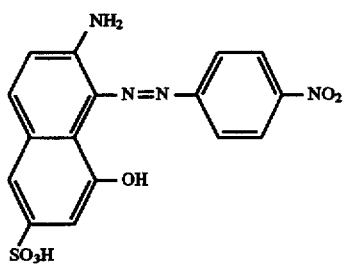

is obtained 1000 parts of the suspension thus obtainable are heated to a temperature of 55° C. and 39 parts of sodium sulfide are added. The solution formed is subsequently stirred at a temperature of 72° to 75° C. for 15 minutes and then clarified by filtration. After addition of 90 parts of an aqueous sodium hydroxide solution (30%), the resulting precipitate is filtered off after some time, washed with aqueous sodium chloride solution (15%) and dried in vacuo at a temperature of 50° to 60° C. 83 parts of a compound which, in the form of the free acid, has the formula

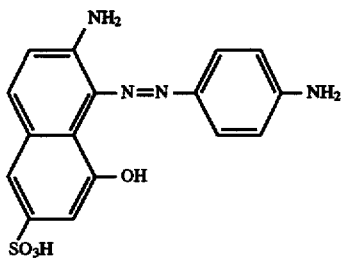

are obtained.

The compounds of the formulae

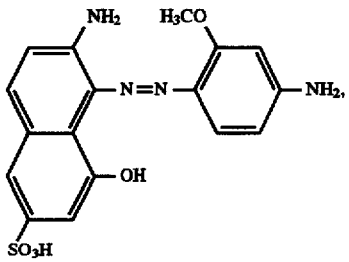

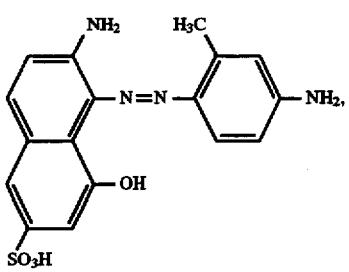

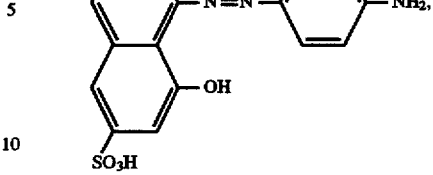

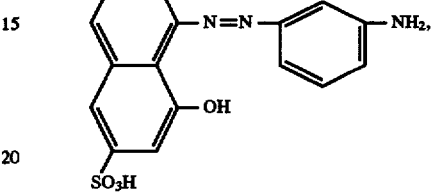

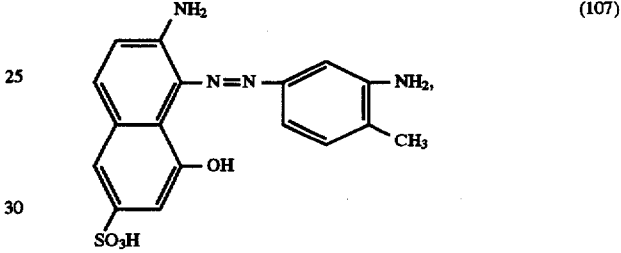

and

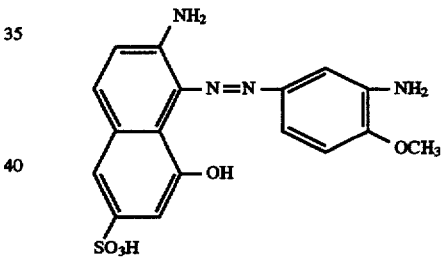

can be obtained in an analogous manner to Preparation Example 1.

Preparation Example 2

After stirring into 200 parts of water and 50 parts of hydrochloric acid (32%), 30 parts of 4-aminoacetanilide are diazotized with 50 parts of a 4 normal sodium nitrite solution at a temperature of 5° to 10° C. Excess nitrite is destroyed with a little sulfamic acid.

The diazo solution thus prepared is allowed to run into a second solution which comprises 59.9 parts of phenyl-peri acid and 600 parts of water and is brought to a pH of 8 with aqueous sodium hydroxide solution. While the diazo solution is running in, the pH is kept at a value of 8 to 9 by addition of aqueous sodium hydroxide solution. The resulting compound is then precipitated out by addition of sodium chloride, washed with aqueous sodium chloride solution and dried in vacuo at a temperature of 50° to 60° C. 102 parts of a compound which, in the form of the free acid, has the formula

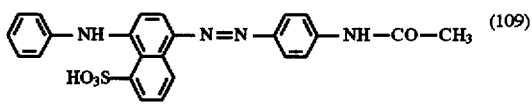

are obtained.

100 parts of the compound of the formula (109) obtainable as described above are hydrolyzed at the boil in 225 parts of water and 112 parts of an aqueous sodium hydroxide solution (30%). The resulting mass is diluted with water, filtered hot and washed with aqueous sodium chloride solution (15%). After drying in vacuo at a temperature of 50° to 60° C., 75 parts of a compound which, in the form of the free acid, has the formula

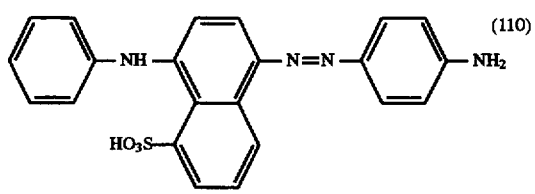

are obtained.

The compounds of the formulae

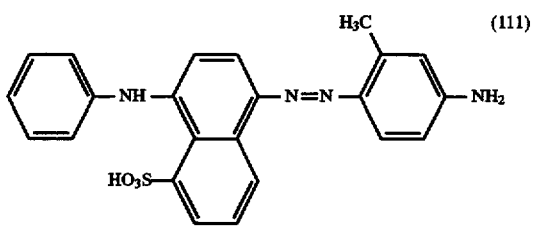

and

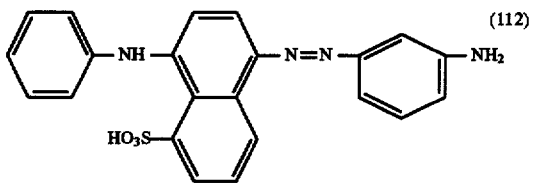

can be obtained in an analogous manner to Preparation Example 2.

Preparation Example 3

11.14 parts of 1-naphthylamine-5-sulfonic acid are dissolved in 100 parts of water at room temperature and at a pH of 7 to 8. After addition of 12.5 parts of 4 normal sodium nitrite solution, the solution thus obtained is added dropwise to a mixture comprising 100 parts of ice and 12.5 parts of hydrochloric acid (32%). After some time, excess nitrite is destroyed with sulfamic acid.

To prepare a second solution, 10.85 parts of 2-methoxyanilinomethanesulfonic acid are dissolved in 100 parts of water at a pH of 8. After admixing 6.3 parts of sodium bicarbonate, the diazo component solution obtainable as described above is added dropwise and the pH is kept at a value of 6.5 to 7 by addition of a further 1.8 parts of sodium bicarbonate. The resulting compound is then precipitated out by addition of sodium chloride and filtered off. 72 parts of a compound which, in the form of the free acid, has the formula

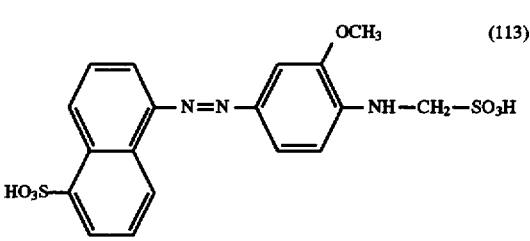

are obtained.

72 parts of the compound of the formula (113) obtainable as described above are stirred in 200 parts of water, and 20 parts of sodium hydroxide are added. After hydrolysis at the boiling point, a pH of 10 is established with 45 parts of hydrochloric acid (32%), and the resulting compound is filtered off at room temperature, washed with an aqueous sodium chloride solution and dried in vacuo at a temperature of 50° to 60° C. 16 parts of a compound which, in the form of the free acid, has the formula

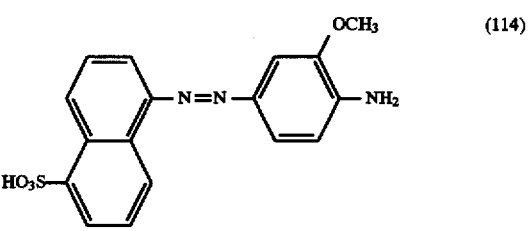

are obtained.

The compounds of the formula

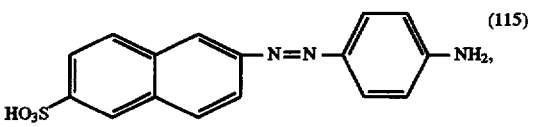

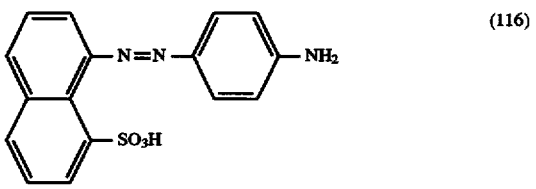

and

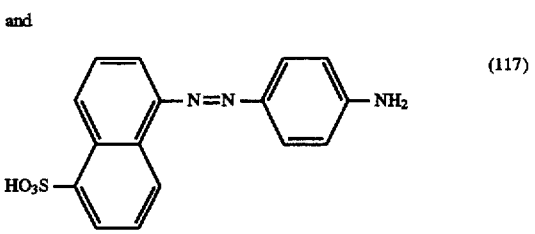

can be obtained in an analogous manner to Preparation Example 3.

EXAMPLE 1

3.58 parts of the compound of the formula

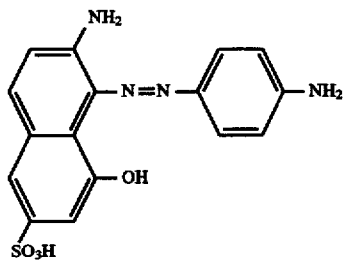 (102)

are dissolved in 50 parts of hot water under neutral conditions and 2.5 parts of a 4 normal sodium nitrite solution are added. The solution thus obtained is added to a mixture of 50 parts of ice and 3 parts of hydrochloric acid (32%). After some time, the excess nitrite is destroyed with sulfamic acid.

The diazo component suspension thus obtained is added to a second solution which comprises 0.94 part of phenol and 50 parts of water. A pH of 9 is maintained during this procedure by addition of an aqueous sodium hydroxide solution. When the coupling has ended, the dye which has precipitated out is filtered off, washed with dilute sodium chloride solution and dried in vacuo at a temperature of 50° to 60° C. 4.3 parts of a dye which, in the form of the free acid, is the compound of the formula

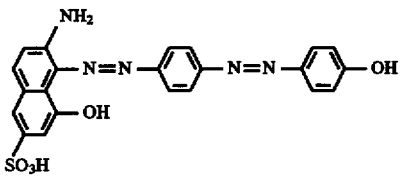 (118)

are obtained. The dye of the formula (118) dyes wool and synthetic polyamide fibre material in claret-red colour shades.

EXAMPLES 2 to 139

The dyes shown in the form of the free acid in column 2 in the following Table 1 can be obtained analogously to the instructions in Example 1. The dyes shown in column 2 in Table 1 dye wool and synthetic polyamide fibre material in the colour shades shown in column 3 in Table 1.

TABLE 1

| Example | Dye | Color shade |
|---|---|---|
| 2 | (structure) | Claret |
| 3 | (structure) | Blue |
| 4 | (structure) | Blue |

TABLE 1-continued

| Example | Dye | Color shade |
|---------|-----|-------------|
| 5 | [structure: 2-amino-8-hydroxy-6-sulfonaphthalene linked via N=N to para-phenylene, then N=N to 2-(methylamino)-8-hydroxy-6-sulfonaphthalene] | Blue |
| 6 | [structure: 2-amino-8-hydroxy-6-sulfonaphthalen-1-yl –N=N– phenylene –N=N– 4-hydroxynaphthalen-1-yl] | Blue |
| 7 | [structure: 2-amino-8-hydroxy-6-sulfonaphthalen-1-yl –N=N– phenylene –N=N– 3-hydroxy-5-sulfonaphthalen-4-yl] | Violet |
| 8 | [structure: 2-amino-8-hydroxy-6-sulfonaphthalen-1-yl –N=N– phenylene –N=N– 2-hydroxy-6-sulfonaphthalen-1-yl] | Violet |
| 9 | [structure: 2-amino-8-hydroxy-6-sulfonaphthalen-1-yl –N=N– phenylene –N=N– 2-amino-6-sulfonaphthalen-1-yl] | Violet |
| 10 | [structure: 2-amino-8-hydroxy-6-sulfonaphthalen-1-yl –N=N– phenylene –N=N– 4-amino-5-sulfonaphthalen-1-yl] | Blue |

TABLE 1-continued

| Example | Dye | Color shade |
|---------|-----|-------------|
| 11 | 2-amino-8-hydroxy-6-sulfonaphthalene—N=N—(1,4-phenylene)—N=N—4-amino-naphthalene-sulfonic acid | Blue |
| 12 | 2-amino-8-hydroxy-6-sulfonaphthalene—N=N—(1,4-phenylene)—N=N—(4-hydroxy-1-sulfonaphthalen-3-yl) | Blue |
| 13 | 2-amino-8-hydroxy-6-sulfonaphthalene—N=N—(1,4-phenylene)—N=N—(4-amino-1-sulfonaphthalen-3-yl) | Blue |
| 14 | 2-amino-8-hydroxy-6-sulfonaphthalene—N=N—(1,4-phenylene)—N=N—(2-methyl-4-hydroxyphenyl) | Claret |
| 15 | 2-amino-8-hydroxy-6-sulfonaphthalene—N=N—(1,4-phenylene)—N=N—(3-methyl-4-hydroxyphenyl) | Claret |

TABLE 1-continued
| Example | Dye | Color shade |
|---|---|---|
| 16 |  | Claret |
| 17 |  | Claret |
| 18 | 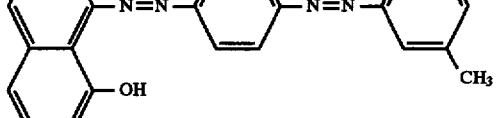 | Blue |
| 19 |  | Claret |
| 20 | 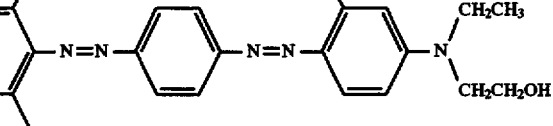 | Violet |
| 21 |  | Claret |

TABLE 1-continued
| Example | Dye | Color shade |
|---|---|---|
| 22 | 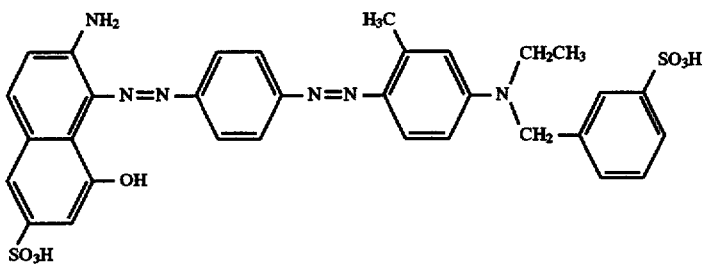 | Blue |
| 23 | 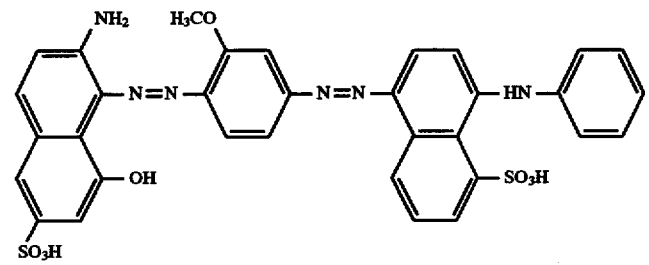 | Blue |
| 24 | 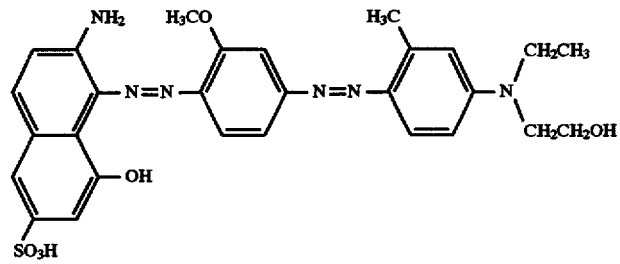 | Blue |
| 25 | 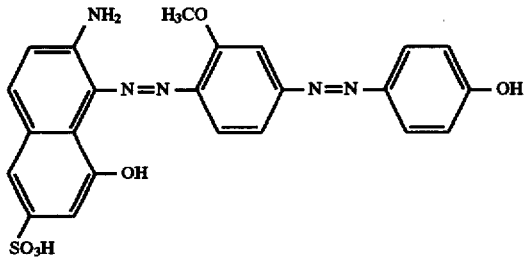 | Violet |
| 26 | 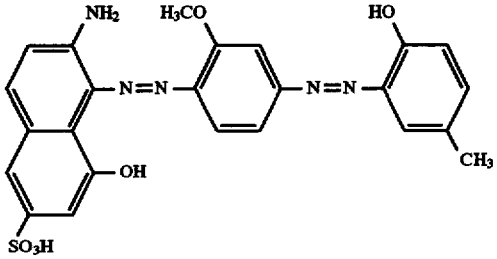 | Violet |

TABLE 1-continued

| Example | Dye | Color shade |
|---|---|---|
| 27 | | Blue |
| 28 | | Blue |
| 29 | | Blue |
| 30 | | Blue |
| 31 | | Claret |
| 32 | | Claret |

TABLE 1-continued

| Example | Dye | Color shade |
|---|---|---|
| 33 | [structure: 7-amino-8-hydroxynaphthalene-sulfonic acid — azo — 2-methylphenyl — azo — 4-aminonaphthalene-sulfonic acid] | Blue |
| 34 | [structure: 7-amino-8-hydroxynaphthalene-sulfonic acid — azo — 2-methylphenyl — azo — 4-hydroxynaphthalene-sulfonic acid] | Blue |
| 35 | [structure: 7-amino-8-hydroxynaphthalene-sulfonic acid — azo — 2-methoxyphenyl — azo — naphthalene with NHPh and SO$_3$H] | Blue |
| 36 | [structure: 7-amino-8-hydroxynaphthalene-sulfonic acid — azo — 2-methoxyphenyl — azo — 2-methyl-4-(N-ethyl-N-hydroxyethylamino)phenyl] | Blue |
| 37 | [structure: 7-amino-8-hydroxynaphthalene-sulfonic acid — azo — 2-methoxyphenyl — azo — 4-hydroxyphenyl] | Violet |

TABLE 1-continued

| Example | Dye | Color shade |
|---|---|---|
| 38 | [structure] | Violet |
| 39 | [structure] | Blue |
| 40 | [structure] | Blue |
| 41 | [structure] | Red |
| 42 | [structure] | Red |
| 43 | [structure] | Scarlet |

TABLE 1-continued

| Example | Dye | Color shade |
|---------|-----|-------------|
| 44 | (structure) | Scarlet |
| 45 | (structure) | Red |
| 46 | (structure) | Red |
| 47 | (structure) | Claret |
| 48 | (structure) | Claret |

TABLE 1-continued

| Example | Dye | Color shade |
|---|---|---|
| 49 | | Scarlet |
| 50 | | Scarlet |
| 51 | | Claret |
| 52 | | Red |
| 53 | | Claret |
| 54 | | Claret |

TABLE 1-continued

| Example | Dye | Color shade |
|---|---|---|
| 55 | (structure) | Scarlet |
| 56 | (structure) | Scarlet |
| 57 | (structure) | Claret |
| 58 | (structure) | Red |
| 59 | (structure) | Violet |
| 60 | (structure) | Claret |

TABLE 1-continued

| Example | Dye | Color shade |
|---|---|---|
| 61 | | Claret |
| 62 | | Blue |
| 63 | | Blue |
| 64 | | Blue |
| 65 | | Blue |
| 66 | | Claret |
| 67 | | Claret |

TABLE 1-continued

| Example | Dye | Color shade |
|---------|-----|-------------|
| 68 | [Structure: phenyl-NH-naphthalene(SO₃H)-N=N-(3-methylphenyl)-N=N-naphthalene(NH₂)(SO₃H)] | Blue |
| 69 | [Structure: phenyl-NH-naphthalene(SO₃H)-N=N-(3-methylphenyl)-N=N-naphthalene(OH)(SO₃H)] | Blue |
| 70 | [Structure: phenyl-NH-naphthalene(SO₃H)-N=N-phenyl-N=N-naphthalene(NH-phenyl)(SO₃H)] | Red |
| 71 | [Structure: phenyl-NH-naphthalene(SO₃H)-N=N-phenyl-N=N-(3-methyl-4-(N-ethyl-N-hydroxyethylamino)phenyl)] | Red |
| 72 | [Structure: phenyl-NH-naphthalene(SO₃H)-N=N-phenyl-N=N-(4-hydroxyphenyl)] | Scarlet |
| 73 | [Structure: phenyl-NH-naphthalene(SO₃H)-N=N-phenyl-N=N-(2-hydroxy-5-methylphenyl)] | Scarlet |

TABLE 1-continued

| Example | Dye | Color shade |
|---|---|---|
| 74 | (structure) | Red |
| 75 | (structure) | Violet |
| 76 | (structure) | Yellow |
| 77 | (structure) | Yellow |
| 78 | (structure) | Violet |
| 79 | (structure) | Yellow |

TABLE 1-continued
| Example | Dye | Color shade |
|---|---|---|
| 80 | 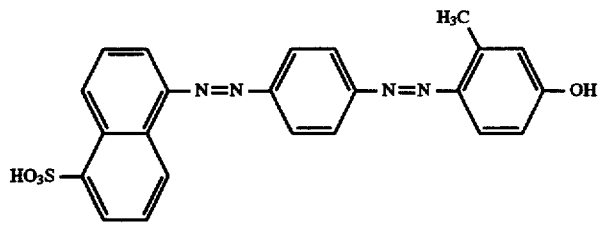 | Yellow |
| 81 | 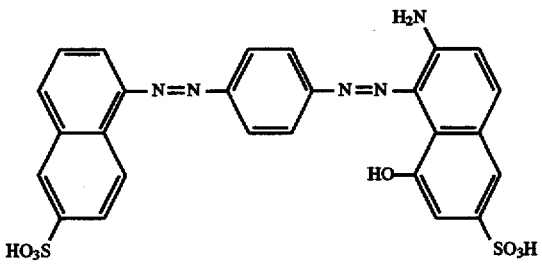 | Violet |
| 82 | 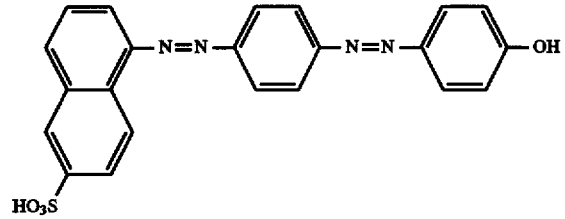 | Yellow |
| 83 | 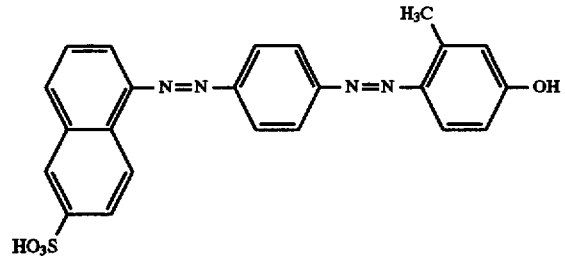 | Yellow |
| 84 | 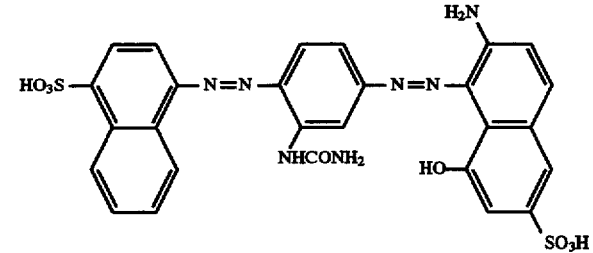 | Blue |
| 85 |  | Orange |

TABLE 1-continued

| Example | Dye | Color shade |
|---|---|---|
| 86 | | Orange |
| 87 | | Blue |
| 88 | | Orange |
| 89 | | Orange |
| 90 | | Blue |
| 91 | | Orange |
| 92 | | Orange |

TABLE 1-continued

| Example | Dye | Color shade |
|---|---|---|
| 93 | (naphthalene-SO₃H)–N=N–(benzene with NHCONH₂)–N=N–(naphthalene with H₂N, HO, SO₃H) | Blue |
| 94 | (naphthalene-SO₃H)–N=N–(benzene with NHCONH₂)–N=N–(benzene with H₃C, OH) | Orange |
| 95 | (HO₃S-naphthalene)–N=N–(benzene with NHCOCH₃)–N=N–(naphthalene with H₂N, HO, SO₃H) | Blue |
| 96 | (HO₃S-naphthalene)–N=N–(benzene with NHCOCH₃)–N=N–(benzene-OH) | Orange |
| 97 | (HO₃S-naphthalene)–N=N–(benzene with NHCOCH₃)–N=N–(benzene with H₃C, OH) | Orange |
| 98 | (HO₃S-naphthalene)–N=N–(benzene with NHCOCH₃)–N=N–(naphthalene with H₂N, HO, SO₃H) | Blue |

TABLE 1-continued

| Example | Dye | Color shade |
|---|---|---|
| 99 | Naphthalene(HO₃S)-N=N-C₆H₃(NHCOCH₃)-N=N-C₆H₄-OH | Orange |
| 100 | Naphthalene(HO₃S)-N=N-C₆H₃(NHCOCH₃)-N=N-C₆H₃(CH₃)-OH | Orange |
| 101 | Naphthalene(HO₃S)-N=N-C₆H₃(NHCOCH₃)-N=N-naphthalene(NH₂)(OH)(SO₃H) | Blue |
| 102 | Naphthalene(HO₃S)-N=N-C₆H₃(NHCOCH₃)-N=N-C₆H₄-OH | Orange |
| 103 | Naphthalene(HO₃S)-N=N-C₆H₃(NHCOCH₃)-N=N-C₆H₃(CH₃)-OH | Orange |
| 104 | Naphthalene(HO₃S)-N=N-C₆H₃(OCH₃)-N=N-naphthalene(NH₂)(OH)(SO₃H) | Blue |

TABLE 1-continued
| Example | Dye | Color shade |
|---|---|---|
| 105 | 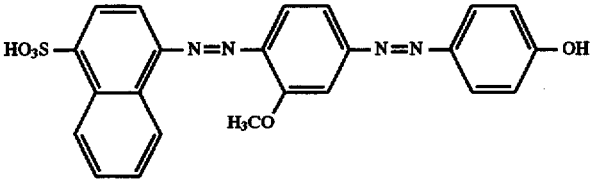 | Orange |
| 106 | 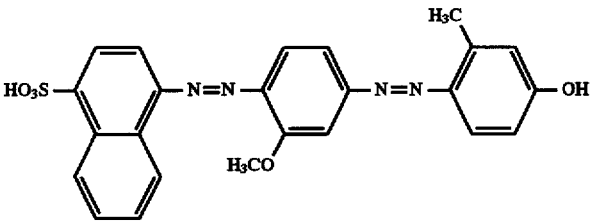 | Orange |
| 107 | 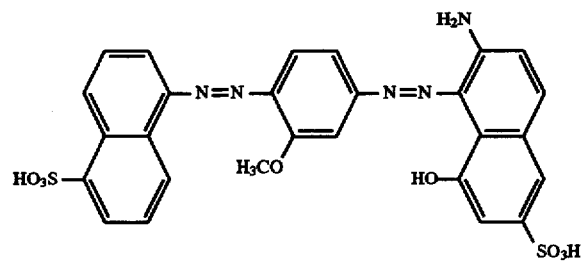 | Blue |
| 108 | 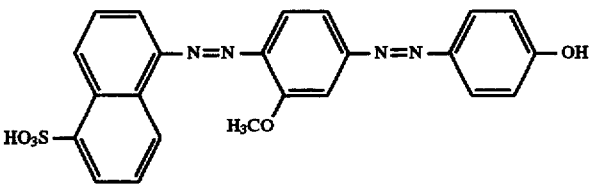 | Orange |
| 109 | 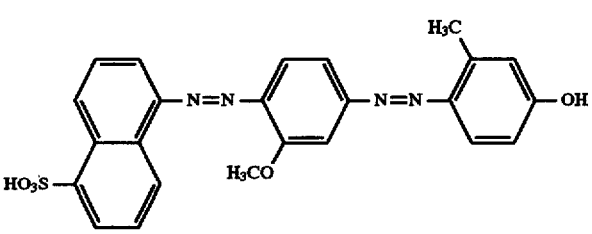 | Orange |
| 110 | 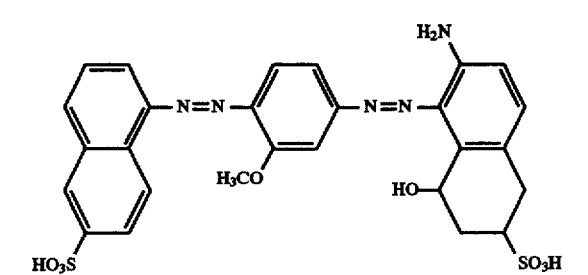 | Blue |
| 111 | 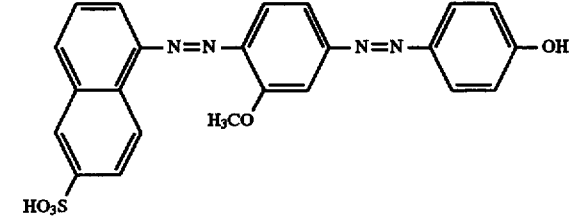 | Orange |

TABLE 1-continued

| Example | Dye | Color shade |
|---|---|---|
| 112 | Naphthalene(6-SO₃H)-1-N=N-[benzene(3-OCH₃)]-4-N=N-[benzene(2-CH₃, 4-OH)] | Orange |
| 113 | Naphthalene(5-SO₃H)-1-N=N-[benzene(3-OCH₃)]-4-N=N-[naphthalene(2-NH₂, 8-OH, 6-SO₃H)] | Blue |
| 114 | Naphthalene(5-SO₃H)-1-N=N-[benzene(3-OCH₃)]-4-N=N-[benzene(4-OH)] | Orange |
| 115 | Naphthalene(5-SO₃H)-1-N=N-[benzene(3-OCH₃)]-4-N=N-[benzene(2-CH₃, 4-OH)] | Orange |
| 116 | Naphthalene(5-SO₃H)-1-N=N-[benzene(3-OCH₃)]-4-N=N-[naphthalene(2-NH₂, 8-OH, 6-SO₃H)] | Blue |
| 117 | Naphthalene(5-SO₃H)-1-N=N-[benzene(3-OCH₃)]-4-N=N-[benzene(4-OH)] | Orange |

TABLE 1-continued

| Example | Dye | Color shade |
|---|---|---|
| 118 | naphthalene(HO₃S)-N=N-phenyl(OCH₃)-N=N-phenyl(H₃C)(OH) | Orange |
| 119 | naphthalene(HO₃S)-N=N-phenyl(OCH₃)-N=N-naphthalene(H₂N)(HO)(SO₃H) | Blue |
| 120 | naphthalene(HO₃S)-N=N-phenyl(OCH₃)-N=N-phenyl(OH) | Orange |
| 121 | naphthalene(HO₃S)-N=N-phenyl(OCH₃)-N=N-phenyl(H₃C)(OH) | Orange |
| 122 | naphthalene(HO₃S)-N=N-phenyl(H₃C)-N=N-naphthalene(H₂N)(HO)(SO₃H) | Violet |
| 123 | naphthalene(HO₃S)-N=N-phenyl(H₃C)-N=N-phenyl(OH) | Yellow |

TABLE 1-continued
| Example | Dye | Color shade |
|---------|-----|-------------|
| 124 | 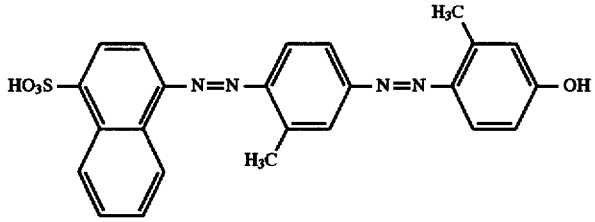 | Orange |
| 125 | 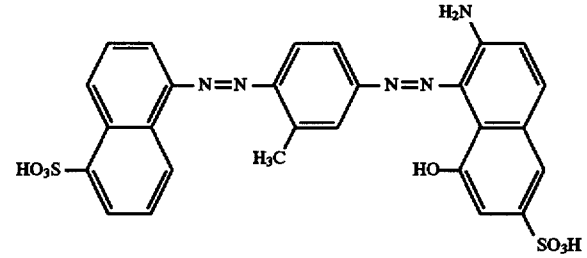 | Violet |
| 126 | 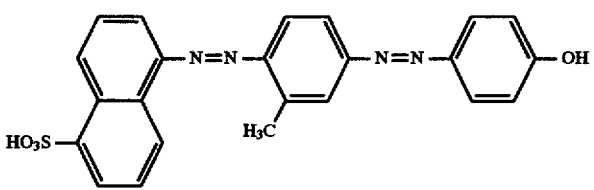 | Yellow |
| 127 | 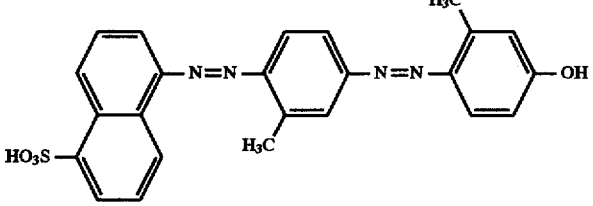 | Orange |
| 128 | 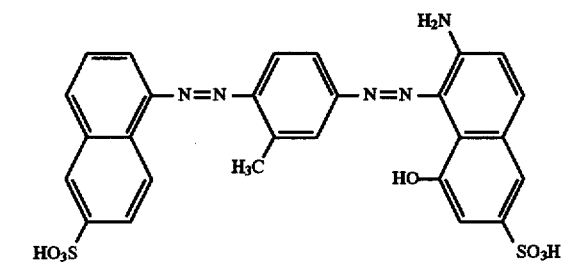 | Violet |
| 129 | 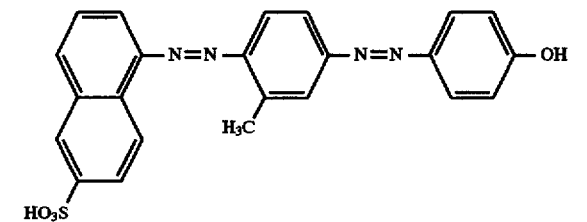 | Yellow |

TABLE 1-continued

| Example | Dye | Color shade |
|---|---|---|
| 130 | | Orange |
| 131 | | Violet |
| 132 | | Yellow |
| 133 | | Orange |
| 134 | | Violet |
| 135 | | Yellow |

TABLE 1-continued
| Example | Dye | Color shade |
|---|---|---|
| 136 | 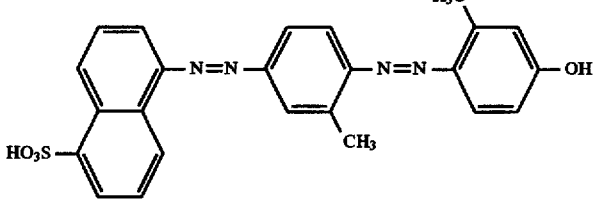 | Orange |
| 137 | 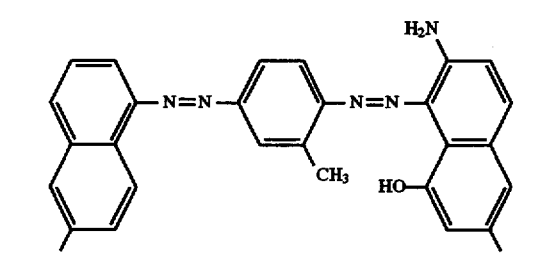 | Violet |
| 138 | 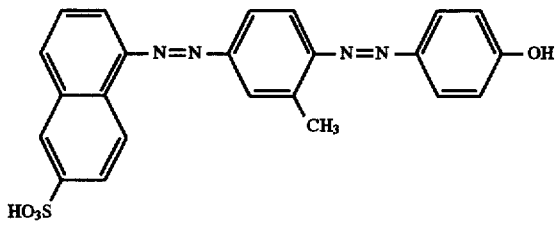 | Yellow |
| 139 | 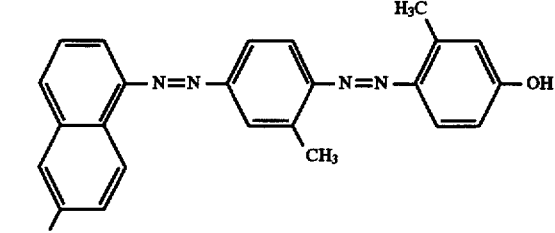 | Orange |
| 140 | 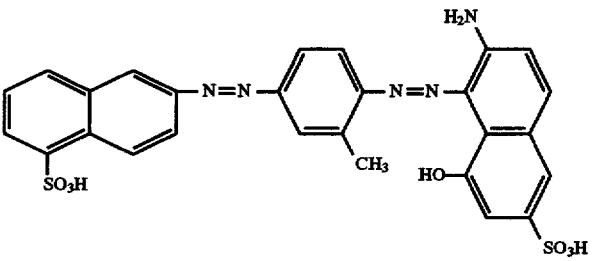 | Violet |
| 141 | 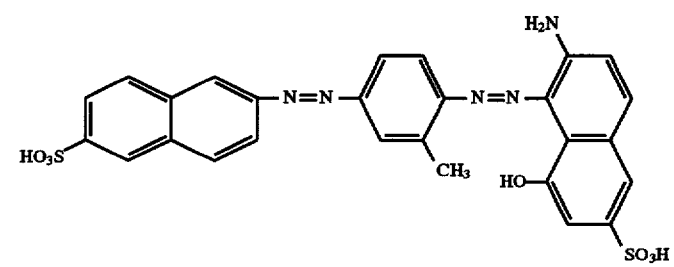 | Violet |

TABLE 1-continued

| Example | Dye | Color shade |
|---|---|---|
| 142 | (structure) | Blue |
| 143 | (structure) | Blue |
| 144 | (structure) | Violet |
| 145 | (structure) | Violet |
| 146 | (structure) | Violet |
| 147 | (structure) | Violet |

TABLE 1-continued

| Example | Dye | Color shade |
|---|---|---|
| 148 | (structure: naphthalene-SO₃H — N=N — benzene(OCH₃) — N=N — naphthalene(NH₂)(OH)(SO₃H)) | Blue |
| 149 | (structure: HO₃S-naphthalene — N=N — benzene(OCH₃) — N=N — naphthalene(NH₂)(OH)(SO₃H)) | Blue |
| 150 | (structure: naphthalene(SO₃H) — N=N — benzene(OCH₃) — N=N — naphthalene(NH₂)(OH)(SO₃H)) | Blue |
| 151 | (structure: naphthalene-SO₃H — N=N — benzene(NHCOCH₃) — N=N — naphthalene(NH₂)(OH)(SO₃H)) | Blue |
| 152 | (structure: HO₃S-naphthalene — N=N — benzene(NHCOCH₃) — N=N — naphthalene(NH₂)(OH)(SO₃H)) | Blue |
| 153 | (structure: naphthalene-SO₃H — N=N — benzene(NHCOCH₂) — N=N — naphthalene(NH₂)(OH)(SO₃H)) | Blue |

TABLE 1-continued

| Example | Dye | Color shade |
|---|---|---|
| 154 | 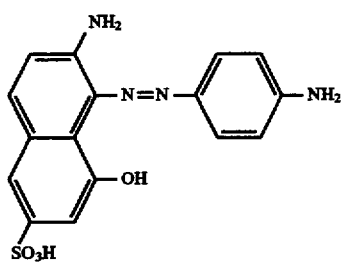 | Blue |
| 155 | | Blue |

EXAMPLE 156

5.37 parts of the compound of the formula (102)

are dissolved in 50 parts of hot water under neutral conditions and 2.5 parts of a 4 normal sodium nitrite solution are added. The solution thus obtained is added to a mixture of 50 parts of ice and 3 parts of hydrochloric acid (32%). After some time, the excess nitrite is destroyed with sulfamic acid.

The diazo component suspension thus obtained is added to a second solution which comprises 4.49 parts of phenyl-peri acid and 60 parts of water, the pH of which is adjusted to neutral. A pH of 7 is maintained during this procedure by addition of an aqueous sodium hydroxide solution. When the coupling has ended, the dye is precipitated out by addition of methanol. The pH is then brought to a value of 11 and the dye is filtered off, washed with dilute sodium chloride solution and dried in vacuo at a temperature of 50° to 60° C. 7.5 parts of a dye which, in the form of the free acid, is the compound of the formula

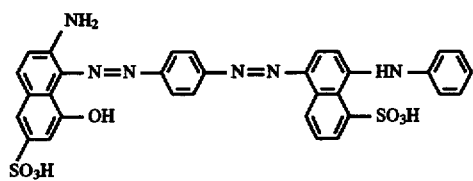 (119)

are obtained. The dye of the formula (119) dyes wool and synthetic polyamide fibre material in blue colour shades.

EXAMPLES 157 to 159

The procedure described in Example 156 is repeated, but using a compound of the formula

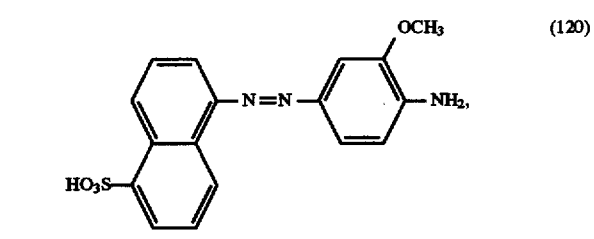 (120)

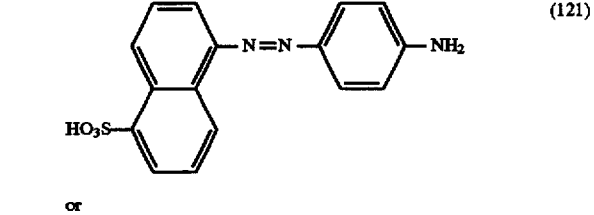 (121)

or

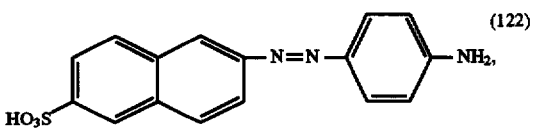 (122)

instead of a compound of the formula (102). Analogous dyestuffs which dye wool and synthetic polyamide fibre material in violet-blue colour shades are obtained.

EXAMPLE 160

2.13 parts of the compound of the formula

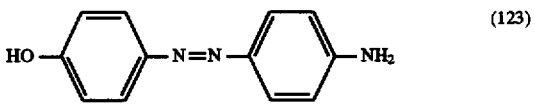 (123)

are dissolved in 25 parts of water at room temperature with the addition of 5.5 parts of 2 normal aqueous sodium hydroxide solution, and 2.5 parts of a 4 normal sodium nitrite solution are added. The solution is added dropwise to a mixture of 25 parts of ice and 3.5 parts of hydrochloric acid (32 %). After some time, the excess nitrite is destroyed with sulfamic acid.

The diazo component suspension thus obtained is allowed to run at room temperature into a second solution which comprises 3 parts of phenyl-peri acid and 50 parts of water, the pH of which is brought to neutral. While the suspension of the diazo component is running in, the pH is kept at a value of 7 to 8 by addition of 2 normal aqueous sodium hydroxide solution. The resulting dye is precipitated out by addition of sodium chloride, filtered off, washed with dilute sodium chloride solution and dried in vacuo at a temperature of 50° to 60° C. 3.8 parts of a dye which, in the form of the free acid, is the compound of the formula

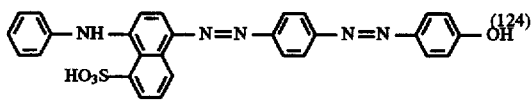

are obtained. The dye of the formula (124) dyes wool and synthetic polyamide fibre material in claret-red colour shades.

5 parts of the dye of the formula (124) are dissolved in 100 parts of water at a temperature of 70° to 75° C and a pH of 9. Diethyl sulfate is then added dropwise, the pH being kept at a value of 9 by addition of 2 normal sodium hydroxide solution. When the end of the alkylation is detected by thin layer chromatography, the dye which has precipitated out is filtered off, washed with dilute sodium chloride solution and dried in vacuo at a temperature of 50° to 60° C. 2.6 parts of a dye which, in the form of the free acid, is the compound of the formula

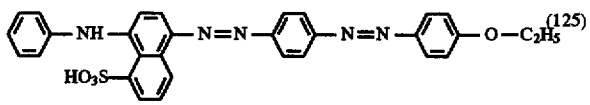

are obtained. The dye of the formula (125) dyes wool and synthetic polyamide fibre material in violet colour shades.

EXAMPLE 161

The dye of the formula

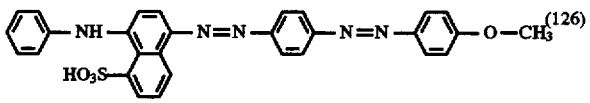

can be obtained analogously to the instructions in Example 160. The dye of the formula (126) dyes wool and synthetic polyamide fibre material in violet colour shades.

Dyeing instructions I:

10 parts of Helanca tricot are dyed in 500 parts of an aqueous liquor which comprises 1 g/l of monosodium phosphate and is brought to pH 6 with disodium phosphate. The content of the dye according to Example 1 is 0.8%, based on the fibre weight. The dyeing time at a temperature of 98° C. is 30 to 90 minutes. The dyed piece of Helanca is then removed from the liquor and washed and dried in the customary manner. A piece of Helanca which has been dyed claret-red and has good overall fastnesses is obtained.

Dyeing instructions II:

10 parts of wool knitting yarn are stirred at 50° C. into a dyebath which comprises 400 parts of water, 0.4 part of the dye according to Example 1 and 5 parts of sodium sulfate and is brought to a pH of 5 with acetic acid. The liquor is brought to the boiling point in the course of 45 minutes and kept at the boiling point for a further 45 minutes. The dyed goods are then removed, rinsed thoroughly with cold water and dried. A claret-red dyeing on wool with good fastness properties is obtained.

What is claimed is:

1. An azo dye of the formula

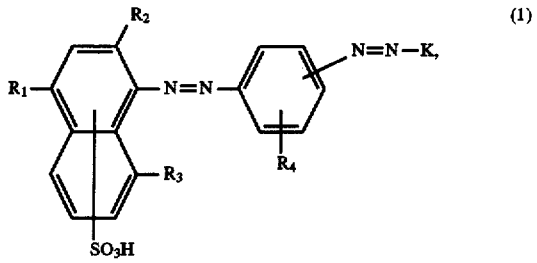

in which $R_1$ is hydrogen or substituted or unsubstituted phenylamino, $R_2$ is hydrogen, amino or N-mono- or N,N-di-$C_1$-$C_4$alkylamino, $R_3$ is hydrogen or hydroxyl, $R_4$ is hydrogen, $C_1$-$C_4$alkyl, $C_1$-$C_4$alkoxy, $C_2$-$C_4$alkanoylamino, ureido or halogen an K is a radical of the formula

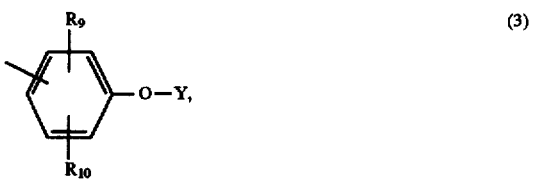

in which

Y is hydrogen or $C_1$-$C_4$alkyl which is unsubstituted or substituted by hydroxyl and $R_9$ and $R_{10}$ independently of one another are hydrogen, $C_1$-$C_4$alkyl, $C_1$-$C_4$alkoxy, $C_2$-$C_4$alkanoylamino, ureido, halogen or sulfo;

or a radical of the formula

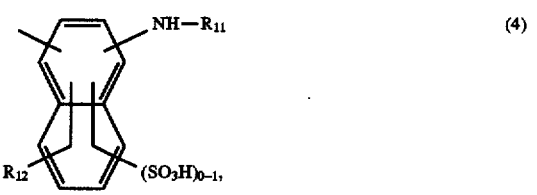

in which $R_H$ is hydrogen, $C_1$-$C_4$alkyl or phenyl which is unsubstituted or substituted by $C_1$-$C_4$alkyl, $C_1$-$C_4$alkoxy, $C_2$-$C_4$alkanoylamino, ureido, halogen or sulfo and $R_{12}$ is hydrogen, $C_1$-$C_4$alkyl, $C_1$-$C_4$alkoxy, $C_2$-$C_4$alkanoylamino, ureido, halogen or hydroxyl;

or a radical of the formula

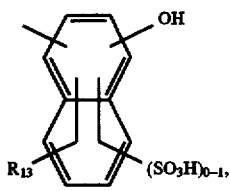 (5)

in which

R$_{13}$ is hydrogen, C$_1$-C$_4$alkyl, C$_1$-C$_4$alkoxy, C$_2$-C$_4$alkanoylamino, ureido or halogen;

or a radical of the formula

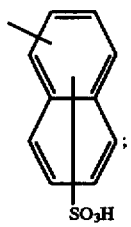 (6)

or a radical of the formula

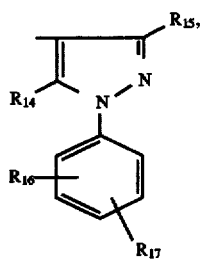 (7)

in which

R$_{14}$ is amino or hydroxyl,

R$_{15}$ is methyl or carboxyl and

R$_{16}$ and R$_{17}$ independently of one another are hydrogen, C$_1$-C$_4$alkyl, C$_1$-C$_4$alkoxy, C$_2$-C$_4$alkanoylamino, ureido, halogen or sulfo;

or a radical of the formula

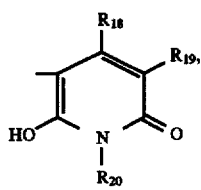 (8)

in which

R$_{18}$ is hydrogen or C$_1$-C$_4$alkyl,

R$_{19}$ is cyano, carbamoyl or sulfomethyl and

R$_{20}$ is hydrogen, C$_1$-C$_4$alkyl or phenyl which is unsubstituted or substituted by C$_1$-C$_4$alkyl, C$_1$-C$_4$alkoxy, C$_2$-C$_4$alkanoylamino, ureido, halogen or sulfo;

or a radical of the formula

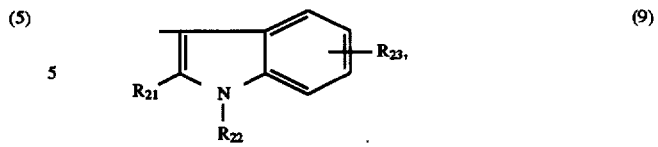 (9)

in which

R$_{21}$ is hydrogen, C$_1$-C$_8$alkyl or phenyl which is unsubstituted or substituted by C$_1$-C$_4$alkyl, C$_1$-C$_4$alkoxy, C$_2$-C$_4$alkanoylamino, ureido, halogen or sulfo, R$_{22}$ is hydrogen or C$_1$-C$_8$alkyl and R$_{23}$ is hydrogen, C$_1$-C$_4$alkyl, C$_1$-C$_4$alkoxy, C$_2$-C$_4$alkanoylamino, ureido, halogen or sulfo;

and the azo dye of the formula (1) comprises at least one and not more than two sulfo groups, with the proviso that if K is a radical of the formula (3), the radical R$_4$ is hydrogen.

2. An azo dye according to claim 1, in which

R$_1$ is hydrogen.

3. An azo dye according to claim 1, in which

R$_2$ is hydrogen or amino.

4. An azo dye according to claim 1, in which

R$_4$ is hydrogen, C$_1$-C$_4$alkyl, C$_1$-C$_4$alkoxy, C$_2$-C$_4$alkanoylamino or ureido.

5. An azo according to claim 1, in which

K is a radical of the formula (3), (4) or (6).

6. An azo dye according to claim 1, in which

K is a radical of the formula (4) or (6).

7. An azo dye according to claim 1, of the formula

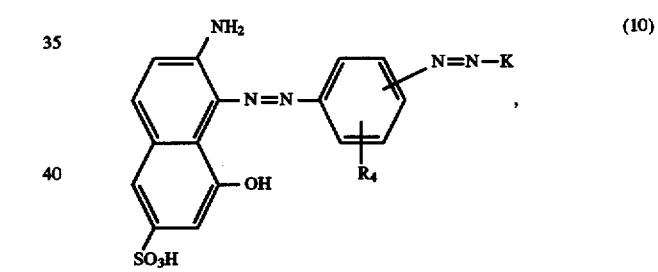 (10)

in which

R$_4$ and K are as defined in claim 1.

8. An azo dye according to claim 7, in which

R$_4$ is hydrogen, C$_1$-C$_4$alkyl, C$_1$-C$_4$alkoxy, C$_2$-C$_4$alkanoylamino or ureido and K is a radical of the formula (3), (4) or (6).

9. An azo dye according to claim 1, of the formula

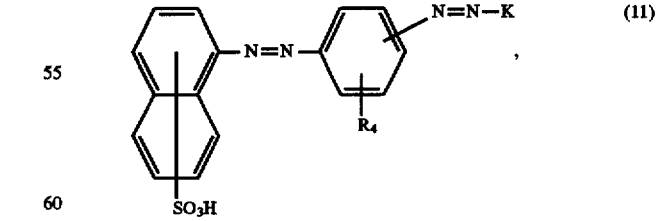 (11)

in which

R$_4$ and K are as defined in claim 1.

10. An azo dye according to claim 9, in which

R$_4$ is hydrogen, C$_1$-C$_4$alkyl, C$_1$-C$_4$alkoxy, C$_2$-C$_4$alkanoylamino or ureido and K is a radical of the formula (3), (4) or (6).

11. A process for the preparation of an azo dye according to claim 1, which comprises diazotizing an amine of the formula

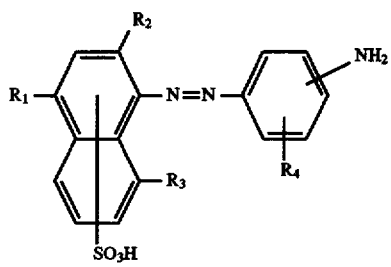   (12)

and coupling the diazotization product to a coupling component of the formula

H—K   (13)

or diazotizing an amine of the formula

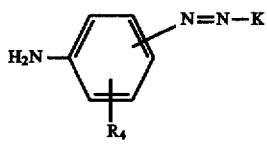   (14)

and coupling the diazotization product to a coupling component of the formula

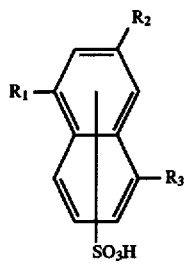   (15)

a conversion reaction being carried out, if appropriate, after the reaction of the compounds of the formulae (12) and (13) or of the compounds of the formulae (14) and (15), and $R_1$, $R_2$, $R_3$, $R_4$ and K being as defined in claim 1.

12. A process for dyeing or printing fibre material containing hydroxyl groups or nitrogen, which process comprises the step of applying to said fibre material a tinctorial amount of an azo dye according to claim 1.

13. A process according to claim 12 wherein said fibre material is naturally occurring or synthetic polyamide fibre material.

* * * * *